No. 888,818. PATENTED MAY 26, 1908.
J. KARRMANN.
CLOSURE FOR JARS, BOTTLES, AND THE LIKE.
APPLICATION FILED NOV. 5, 1906.
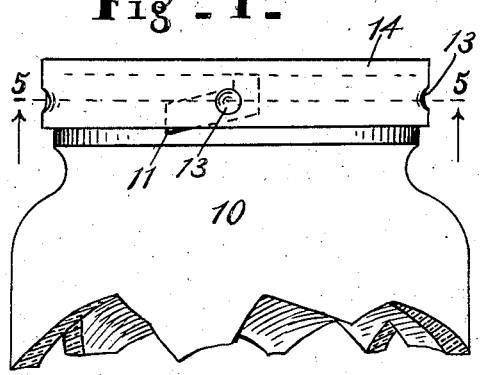
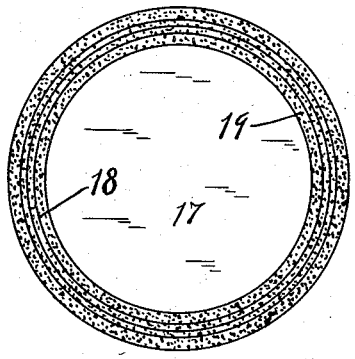
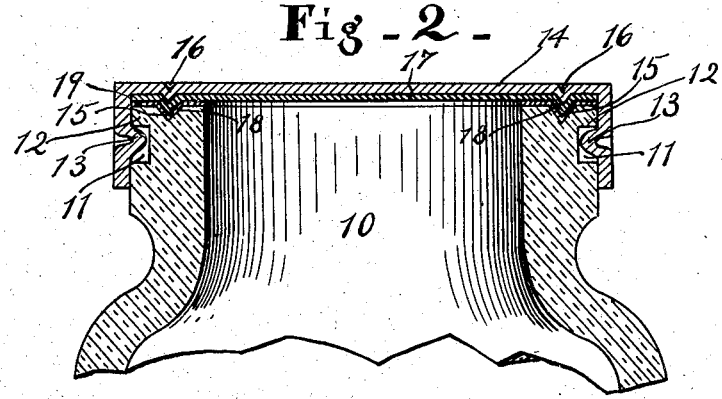
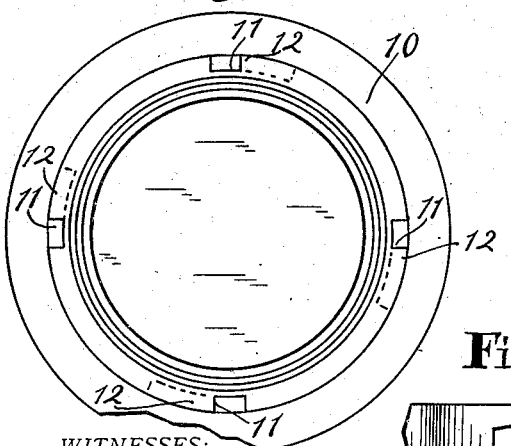
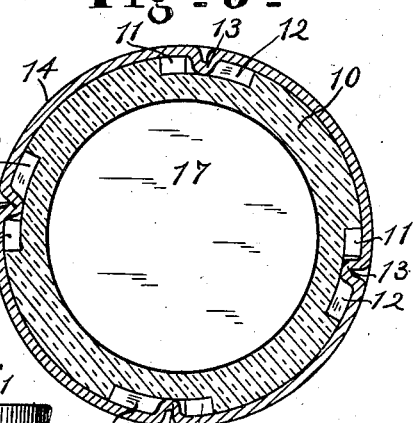
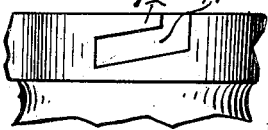
WITNESSES:
W. M. Gentle.
N. Allemong
INVENTOR.
Julius Karrmann.
BY V. H. Lockwood
ATTORNEY.

UNITED STATES PATENT OFFICE.

JULIUS KARRMANN, OF INDIANAPOLIS, INDIANA.

CLOSURE FOR JARS, BOTTLES, AND THE LIKE.

No. 888,818.   Specification of Letters Patent.   Patented May 26, 1908.

Application filed November 5, 1906. Serial No. 342,088.

*To all whom it may concern:*

Be it known that I, JULIUS KARRMANN, of Indianapolis, county of Marion, and State of Indiana, have invented a certain new and useful Closure for Jars, Bottles, and the Like; and I do hereby declare that the following is a full, clear, and exact description thereof, reference being had to the accompanying drawings, in which like numerals refer to like parts.

The object of this invention is to provide an improved means for closing and sealing fruit jars and other kind of jars and bottles, which will be very cheap and easy to make and the lid be readily put in place over the mouth of the jar and removed and the seal be upon the top of the jar and be complete and effective as a seal.

The full nature of the invention will be understood from the accompanying drawing and the following description and claim.

In the drawings Figure 1 is a side elevation of the upper part of a fruit jar with my closure thereon. Fig. 2 is a central vertical section through the same. Fig. 3 is a bottom view of the sealing disk. Fig. 4 is a plan view of the top of the jar, part being broken away. Fig. 5 is a horizontal section on the line 5—5 of Fig. 1 inverted. Fig. 6 is a side elevation of a portion of the upper part of the jar.

The upper part of the fruit jar 10 or other sort of jar or bottle has no threads in it, as usual, but has a plurality of inclined recesses 11. These recesses begin at the top of the jar and extend down vertically a short distance and then obliquely to the left on a line varying slightly from a horizontal line, substantially as shown in Figs. 1 and 6. This provides a ledge or portion 12 under which lugs 13 that extend inwardly from the sidewall of the lid 14 may pass and be forced by the turning of the lid by hand to the right. These lugs 13 may be made in any manner, but the lid herein shown is made of tin or such material as is usually employed for fruit jar lids, and the lugs 13 are formed by being stamped in the sides of the lid, as shown, in Fig. 2.

The top surface of the fruit jar is smooth and horizontal excepting a V-shaped groove 15 that extends annularly and is located midway between the inner and outer sides of the mouth of the jar. There is also a V-shaped rib or bead 16 projecting from the under surface of the top of the lid and extending annularly to register with and fit into said groove 15 in the top of the fruit jar.

A sealing disk 17 having also a downwardly projecting preferably V-shaped annular rib 18, is placed upon the top of the fruit jar, and when the lid is screwed down tightly, the ribs 16 and 18 will be pressed down into the groove 15 of the jar, as shown in Fig. 2, making a tight closure. This disk is made of yielding material like thick paper, and it is preferably paraffined. Along the margin of the under side of the disk there is a band 19 of adhesive material provided, said band being, as shown in Fig. 3, of substantially the same width as the top of the fruit jar. This adhesive material may be formed of a combination of beeswax, paraffin and resin, or any other well known substances of like nature. The function of this adhesive material is to cause the disk 17 to adhere to the top of the fruit jar after the disk has been pressed down tightly upon the fruit jar by the lid 14.

The lid herein provided may be cheaply made as it has no threads in it, and the top of the jar may be made substantially flat, as shown, and the sealing be readily and permanently effected. It is observed that with this arrangrment the contents of the jar can in no manner contact with the metal lid, as is the case when the seal is on an annular shoulder on the neck of the jar, but that the contents can only come in contact with the sealing disk 17. Said disk, therefore not only protects the contents from any external influence, but also protects the lid from the influence of the contents.

I do not wish to be limited to V-shaped grooves or ribs, as a groove or rib not exactly V-shaped answers the purpose.

What I claim as my inventoin and desire to secure by Letters Patent is:

The combination with a fruit jar or the like, of a sealing disk upon the top thereof, and a lid adapted to cover the top of the fruit jar and sealing disk and compress and hold said sealing disk in place between said lid and the top of the fruit jar, said sealing disk being coated with adhesive material on the portion thereof that engages the top of the fruit jar.

In witness whereof, I have hereunto affixed my signature in the presence of the witnesses herein named.

JULIUS KARRMANN.

Witnesses:
N. ALLEMONG.
H. B. McCORD.